(12) United States Patent
Kourieh et al.

(10) Patent No.: US 11,337,515 B2
(45) Date of Patent: *May 24, 2022

(54) QUICK ASSEMBLY TABLE

(71) Applicant: Millwork Expressions, Inc., Duluth, GA (US)

(72) Inventors: Abboud Gabriel Kourieh, Duluth, GA (US); Jacob Johnson, Duluth, GA (US)

(73) Assignee: Millwork Expressons, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,980

(22) Filed: Apr. 13, 2021

(65) Prior Publication Data

US 2021/0227971 A1 Jul. 29, 2021

Related U.S. Application Data

(63) Continuation of application No. 16/992,811, filed on Aug. 13, 2020, now Pat. No. 11,000,119, which is a continuation-in-part of application No. 16/594,334, filed on Oct. 7, 2019, now Pat. No. 10,743,653, which is a continuation of application No. 16/174,775, filed on Oct. 30, 2018, now Pat. No. 10,477,962.

(51) Int. Cl.
*A47B 3/06* (2006.01)
*A47B 13/00* (2006.01)
*B60B 33/00* (2006.01)

(52) U.S. Cl.
CPC .............. *A47B 13/003* (2013.01); *A47B 3/06* (2013.01); *A47B 2013/006* (2013.01); *B60B 33/0002* (2013.01)

(58) Field of Classification Search
CPC ..... A47B 13/003; A47B 13/021; A47B 13/06; A47B 2013/006; A47B 2013/022; A47B 3/06; B60B 33/0002
See application file for complete search history.

(56) References Cited

U.S. PATENT DOCUMENTS

| | | | | |
|---|---|---|---|---|
| 4,905,609 A | * | 3/1990 | Haskins | A47B 13/06 108/23 |
| 8,671,644 B2 | * | 3/2014 | Huang | A47B 13/06 52/653.2 |
| 10,477,962 B1 | * | 11/2019 | Kourieh | A47B 13/06 |
| 2005/0265778 A1 | * | 12/2005 | Tzeng | F16B 12/52 403/231 |
| 2009/0087255 A1 | * | 4/2009 | Jorna | F16B 7/0453 403/171 |
| 2017/0156486 A1 | * | 6/2017 | Blick | F16B 12/30 |

FOREIGN PATENT DOCUMENTS

| | | | | |
|---|---|---|---|---|
| GB | 965046 A | * | 7/1964 | ............. A47B 47/02 |
| GB | 1243093 A | * | 8/1971 | ............. A47B 13/06 |
| GB | 2143122 A | * | 2/1985 | ............. A47B 45/00 |

* cited by examiner

*Primary Examiner* — Matthew W Ing
(74) *Attorney, Agent, or Firm* — Hill, Kertscher & Wharton, LLP; Gregory Ourada

(57) ABSTRACT

A table featuring a horizontal surface, and two supporting trusses designed to be quickly attached and fastened to a horizontal surface, is claimed herein.

3 Claims, 3 Drawing Sheets

QUICK ASSEMBLY TABLE

FIELD OF THE INVENTION

The field of the invention relates to tables, namely, quick assembly tables.

BACKGROUND OF THE INVENTION

The problem addressed by the inventive embodiments disclosed herein is how to easily manufacture a sturdy table that can be transported using a "flat pack" configuration, yet which is easily assembled. Current designs feature tables with hinged legs that fold out for assembly, or legs which are detached and then have to be installed. The disadvantages of these design are that, in the former case, the legs are often either not sturdy, or the hinging mechanism may be too complex for a heavy-duty table; or, in the latter case, assembly is somewhat time consuming and the supporting legs are also not structurally as sound as they could be.

BRIEF SUMMARY OF THE INVENTION

The inventive embodiments disclosed herein involve a heavy-duty table suitable for a wide variety of uses that can be shipped in a flat-pack configuration, contains minimal and that is easy to assemble. Preferred embodiments of the invention employ welded hollow tubing for supporting structure.

DETAILED DESCRIPTION OF THE INVENTION

The invention is described in preferred embodiments in the following description with reference to the Figures, in which like numbers represent the same or similar elements. Reference throughout this specification to "one embodiment", "an embodiment", or similar language means that particular feature, structure, or characteristic described in connection with the embodiment is included in at least one embodiment of the present invention. Thus, appearances of the phrases "in one embodiment", "in an embodiment", "in certain embodiments", and similar language throughout this specification may, but do not necessarily, all refer to the same embodiment. It is noted that, as used in this description, the singular forms "a", "an", and "the" include plural referents unless the context clearly dictates otherwise.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be understood more readily by reference to the following detailed description of the invention taken in connection with the accompanying drawing figures, which form a part of this disclosure. It is to be understood that this invention is not limited to the specific devices, methods, conditions, or parameters described and/ or shown herein, and that the terminology used herein is for the purpose of describing particular embodiments by way of example only and is not intended to be limiting of the claimed invention. Any and all patents and other publications identified in this specification are incorporated by reference as though fully set forth herein.

Figure 1:
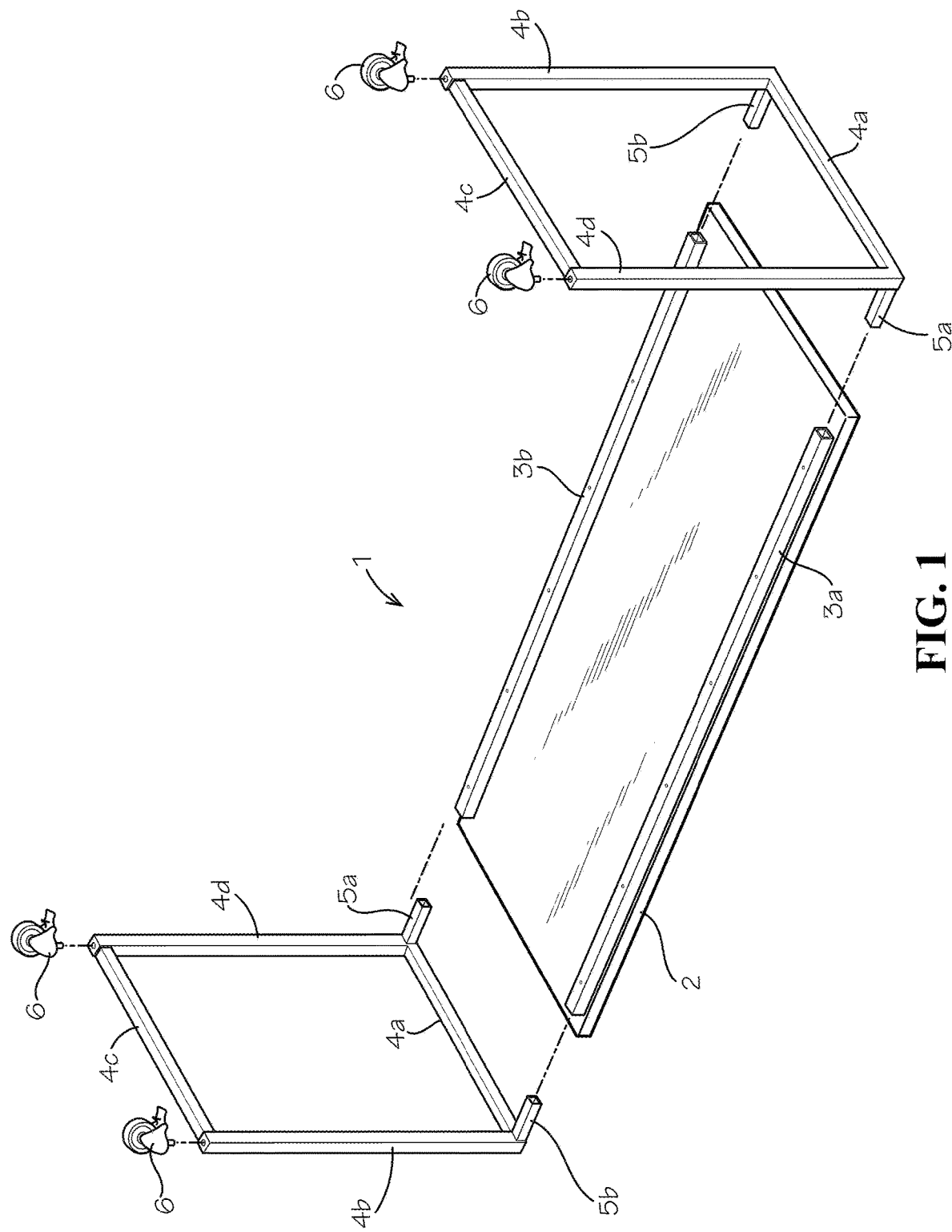
FIG. 1 is an exploded perspective view of a preferred embodiment of the invention.

FIG. 1 shows a preferred embodiment of the inventive concept in an exploded perspective view. Table 1 is comprised of 3 primary parts: table surface 2, and two identical supporting trusses consisting of top and bottom horizontal truss members 4a, and 4c, respectively, and left and right vertical truss members 4b, 4d Table surface 2 is typically composed of a wood product such as particleboard covered with a laminate such as melamine, although either pure hard or softwoods or a metal such as stainless steel may be used depending on the intended application. As can be clearly seen in FIG. 1, the supporting trusses are comprised of the horizontal and vertical truss members, 4a, 4b, 4c, and 4d arranged in coplanar fashion perpendicular to the adjoining members and joined to each other at their edges, preferably by welding. Insertable posts 5a and 5b are attached (again, preferably by welding) and extend perpendicularly from the supporting trusses. These insertable posts 5a and 5b are configured so that they can easily be inserted into a channel defined by the cross section of left and right brace members 3a, 3b.

Figure 1A:
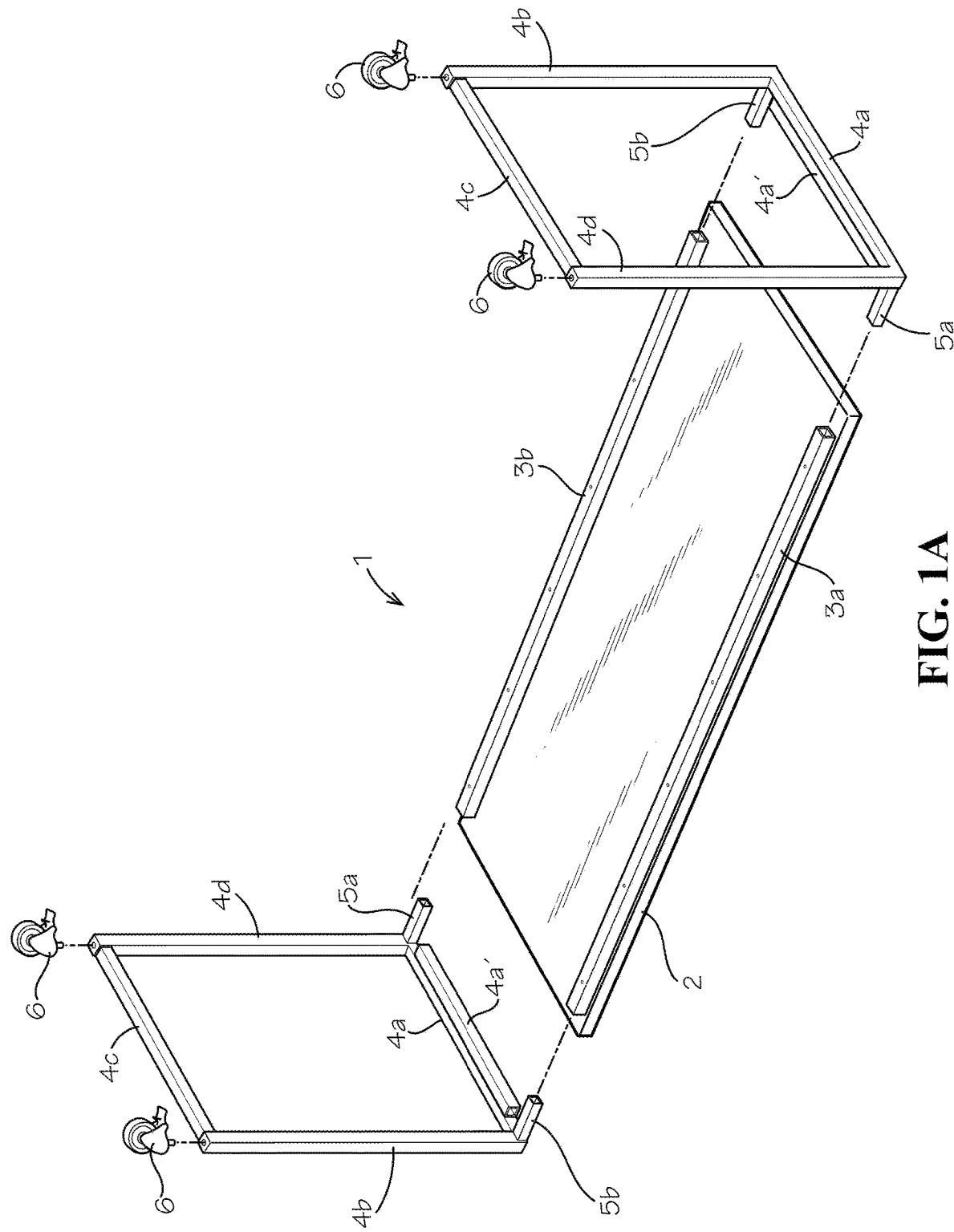
FIG. 1A is an exploded perspective view of another preferred embodiment of the invention.
Figure 2:
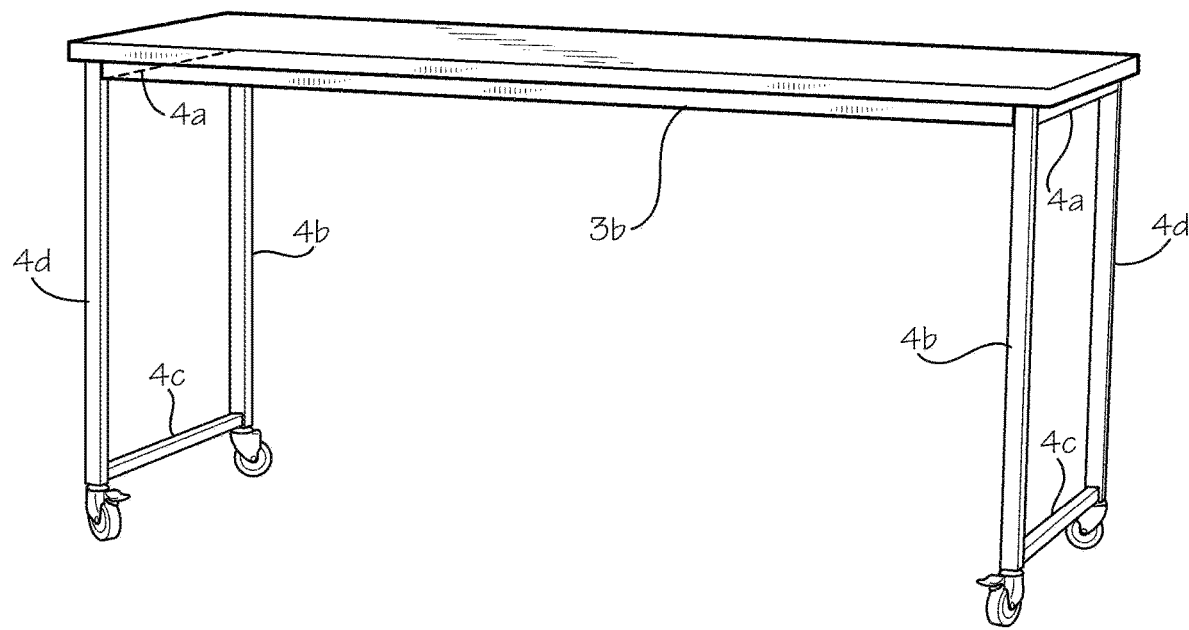
FIG. 2 is a perspective view of a preferred embodiment of the invention.
Figure 3:
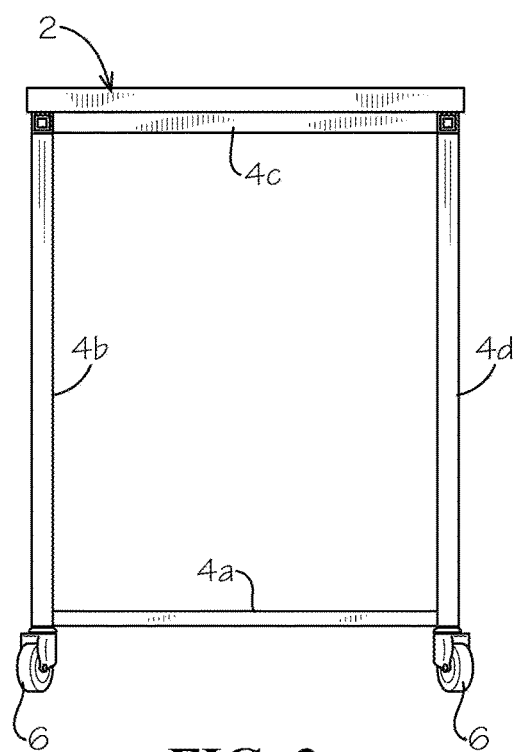
FIG. 3 is a profile view of a preferred embodiment of the invention.

Horizontal and vertical truss members 4a, 4b, 4c, and 4d, and left and right brace members 3a, 3b are hollow metal tubes having a square cross section in the preferred embodiment disclosed by FIG. 1. In an alternative embodiment shown in FIG. 1A, an additional hollow metal tube 4a' is welded to horizontal truss members 4a to provide greater stability. Consequently, insertable posts 5a and 5b are also square in cross section, although these members are usually solid, i.e. they do not feature a hollow cross-sectional shape. Finally, in the embodiment shown in FIG. 1, wheels 6 are attached to the open ends of vertical truss members 4b and 4d.

When being shipped, the supporting trusses and table surface 2 are shipped in "flat pack" with supporting trusses laying on top of table surface 2 with insertable posts 5a and 5b oriented toward table surface 2 and overlapping slightly so that the overall height of the stacked components is minimized After being unpacked, assembly typically takes less than five minutes. Table surface 2 is laid with its top surface on the floor so that its underside is facing upward along with left and right brace members 3a and 3b. Insertable posts 5a and 5b of supporting trusses are then inserted into the ends of left and right brace members 3a and 3b. The top supporting truss member 4a is secured in place by emplacing wood screws through pre-dilled holds in truss member 4a into the underside of table surface 2. Finally, machine screws are screwed into pre-drilled holes in brace members 3a, 3b and insertable posts 5a and 5b.

While the invention has been described with reference to preferred and example embodiments, it will be understood by those skilled in the art that a variety of modifications, additions, and deletions are within the scope of the invention, as defined by the following claims.

What is claimed is:

1. A quick assembly table kit comprising:
   a table surface comprising:
      a horizontal planar member having an upper side and a lower side; and
      two brace members having an interior channel affixed to the lower side of the horizontal planar member; and
   two supporting planar trusses, each supporting planar truss comprising:
      an upper elongated horizontal member and a lower elongated horizontal member welded at their abutting ends to a left and a right elongated vertical member, and insertable posts welded perpendicular to each supporting planar truss, wherein the insertable posts are adapted to be inserted into the interior channel;
   wherein the upper elongated horizontal member comprises a first elongated hollow member and a second elongated hollow member disposed parallel to and abutting one another lengthwise.

2. The quick assembly table kit of claim 1, wherein the second elongated hollow member simultaneously abuts the lower side of the horizontal planar member and the upper elongated horizontal member.

3. The quick assembly table kit of claim 1, wherein the first elongated hollow member is longer than the second elongated hollow member, wherein the second elongated hollow member is disposed so that each end of the first elongated hollow member extends beyond a corresponding end of the second elongated hollow member a distance equal to a width of each of the insertable posts, wherein each of the insertable posts is welded to a portion of the first elongated hollow member extending beyond the second elongated hollow member.

* * * * *